Nov. 20, 1923
1,474,427
B. F. ALINK
INSECT CATCHING DEVICE
Filed March 28, 1923
2 Sheets-Sheet 1
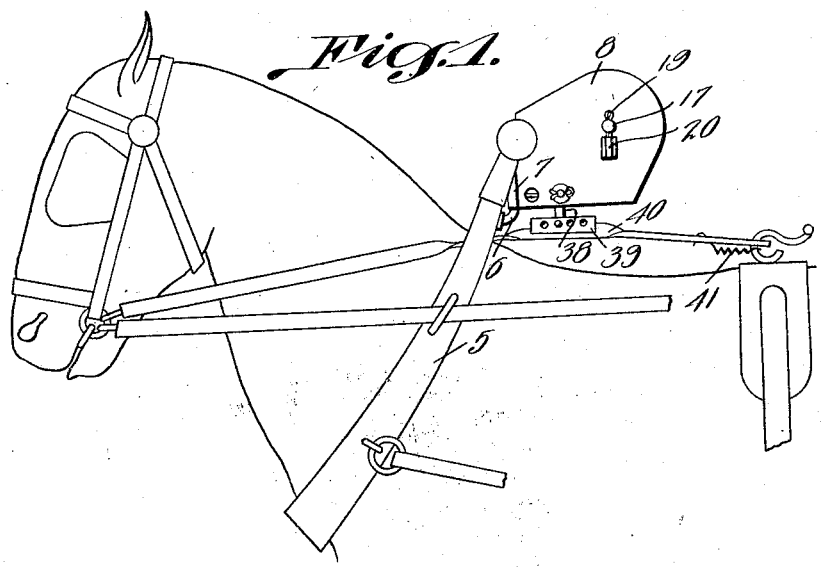
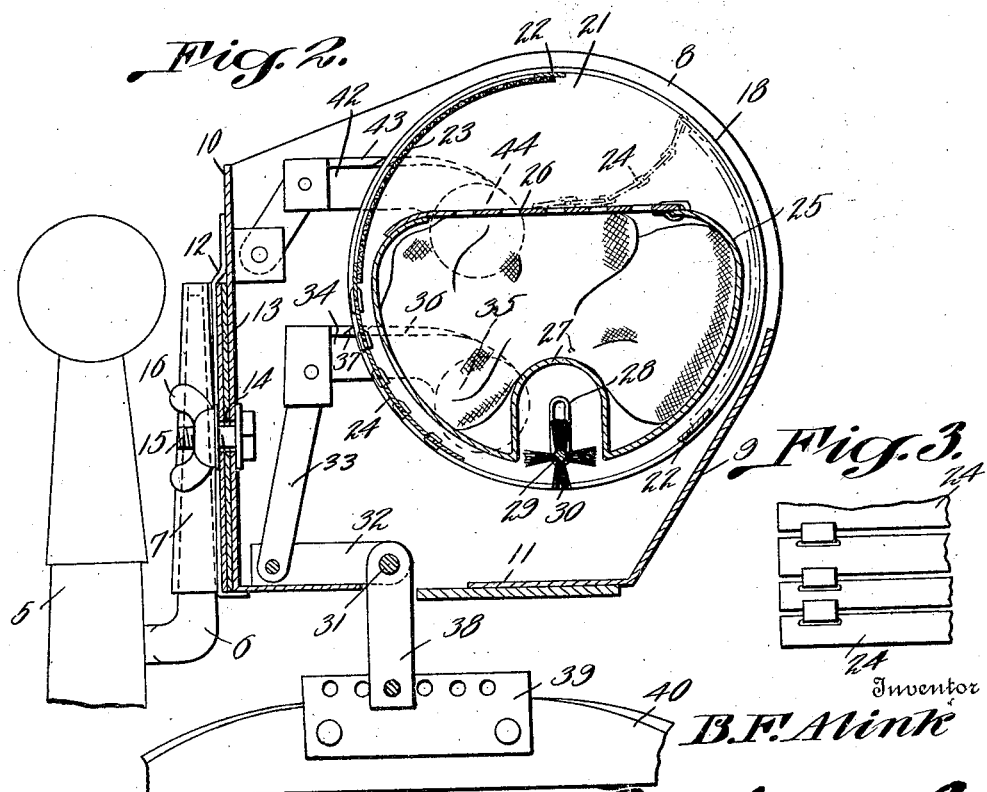
Inventor
B. F. Alink
By C. A. Snow & Co.
Attorneys Nov. 20, 1923
B. F. ALINK
1,474,427
INSECT CATCHING DEVICE
Filed March 28, 1923    2 Sheets-Sheet 2
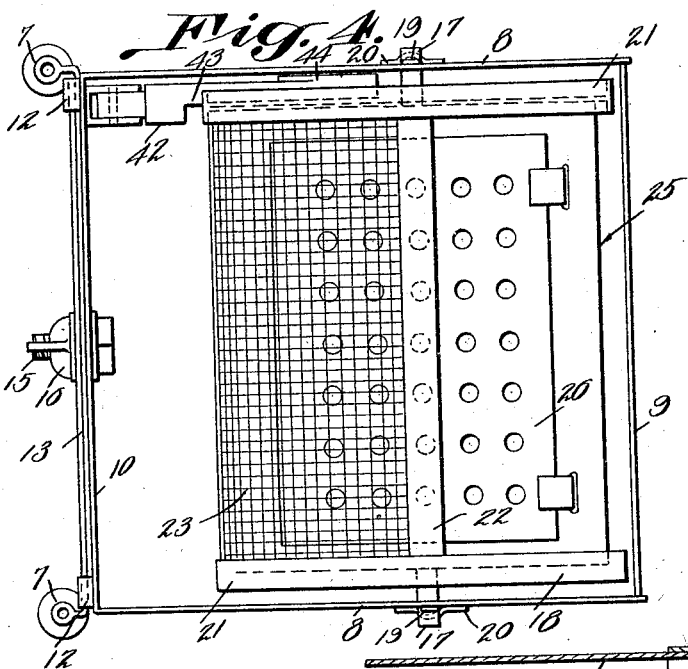
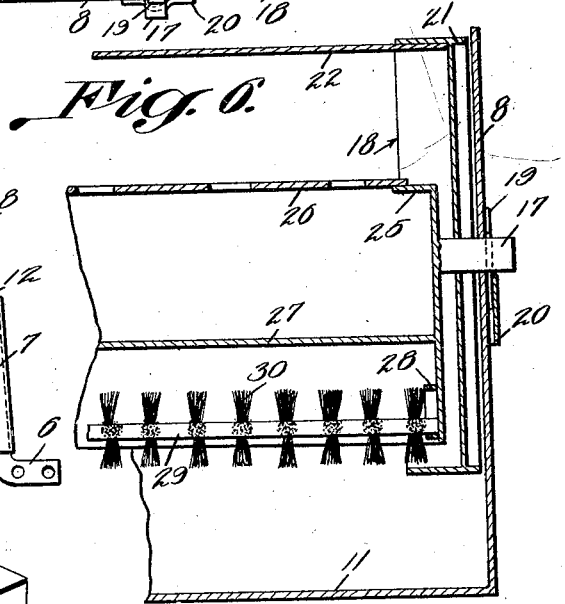
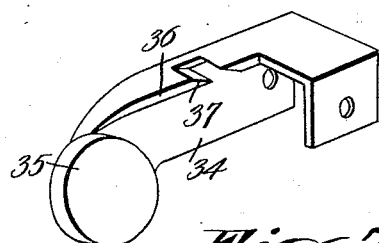
Inventor
B. F. Alink
By C. A. Snow & Co.
Attorneys Patented Nov. 20, 1923.

1,474,427

UNITED STATES PATENT OFFICE.

BENJAMIN F. ALINK, OF SPRING VALLEY, MINNESOTA.

INSECT-CATCHING DEVICE.

Application filed March 28, 1923. Serial No. 628,298.

*To all whom it may concern:*

Be it known that I, BENJAMIN F. ALINK, a citizen of the United States, residing at Spring Valley, in the county of Fillmore and State of Minnesota, have invented a new and useful Insect-Catching Device, of which the following is a specification.

This invention relates to insect catching devices, and more particularly to a device of this character especially constructed to crush the insects caught thereby.

Another object of the invention is to provide means for automatically removing the insects from the screen forming a part of the device after the insects have been crushed.

A further object of the invention is the provision of means whereby the device may be carried by the harness and operated by the movements of an animal's head, thereby providing a device which will be automatic in its operation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 1 is a view in elevation disclosing the application of the device.

Figure 2 is a vertical sectional view through the device.

Figure 3 is a fragmental detail view of one form of apron employed as one of the elements of the device.

Figure 4 is a plan view of the device.

Figure 5 is a front elevational view thereof.

Figure 6 is an enlarged fragmental sectional view of the device.

Figure 7 is a perspective view of one of the weighted arms employed for moving the drum.

Referring to the drawings in detail, the device is shown as supported by the hames of a harness, it being understood that the trap embodied in the present invention, is especially designed for trapping insects flying in proximity to animals.

As shown, the hames, which are indicated at 5, are supplied with upwardly extending bracket members 6 which taper towards their upper ends, to fit within the tapered sleeves 7 that are carried by the supporting frame of the trap.

The frame embodies side plates 8, a curved rear plate 9, a front plate 10 and a bottom plate 11, the front plate 10 being formed with bars 12 spaced therefrom to provide guideways for the cooperating supporting plates 13 that are shown as overlapping each other and provided with elongated openings 14 to accommodate the adjusting bolt 15 on which operates the winged nut 16, whereby these plates 13 may be adjusted laterally to adapt the device for use in connection with hames, wherein the arms thereof are disposed in various distances apart.

Suitable bearings are formed in the side plates 8 and receive the stub shafts 17 that support the drum 18, cotter pins 19 being supplied at one end of each shaft 17, one of which pins extends into a suitable keeper 20, whereby the shaft 17 is restricted against rotary motion.

This drum includes a pair of flanged disks 21 that are held in spaced relation by means of the bars 22 that are also arranged in suitable spaced relation with each other.

The drum is partially covered by the wire mesh material 23 which is supported by these bars. A flexible apron indicated at 24 is also supported by one of the bars and is designed to sweep the surface of the stationary core 25 to remove the insects therefrom.

This core is supported on the shafts 17 and is preferably hollow to contain a suitable liquid to attract insects to the trap, the core being provided with a hinged perforated cover 26, whereby the bait or attracting fluid may be readily and easily positioned therein. The lower portion of the core is formed with a cavity 27 that is formed with guides 28 at the ends thereof, the guides being elongated and designed to receive the ends of the brush shaft 29, whereby the brush 30, supported thereby, may move vertically within the core to sweep the wire mesh material of the drum and clean the same as the drum is being rotated.

Pivotally supported within the body portion and secured to the shaft 31 which is also mounted within the body portion, is an arm 32, to which is secured the vertical arm 33 that carries the arm 34 at the upper end thereof, the arm 34 being provided with a weighted end 35 to normally hold the arm in its lowermost position. This arm 34 is formed with a right angled flange 36 that has an angularly disposed cut out portion 37 adapted to grip one edge of one of the disks 21 so that movement of the arm 34 will produce a rotary movement of the drum.

An arm 38 is also secured to the shaft 31 and depends therefrom, the arm 38 having adjustable connection with the plates 39 supported on the strap 40 which constitutes the usual check ring of a harness, the forward end having connection with the bridle in the usual manner, while the rear end has connection with the saddle of the harness in a manner to permit of slight movement of the check rein, a coiled spring 41 being provided to urge the check rein to its original position. Thus it will be seen that upon each movement of the animal's head, the arm 38 will be rocked to operate the arm 34 to the end that the drum is rotated.

In order that the drum will be restricted against reverse movement, a pivoted arm 42 is provided, which is also formed with an inwardly extended flange 43 formed with a cut out portion to receive a flange of the drum associated therewith to frictionally engage the same and set up a binding action therewith, it being understood that the weight 44 at the free end of the arm 42 normally urges the arm downwardly to accomplish this result.

From the foregoing it will be seen that as the animal, supporting the trap, moves his head, the strap 40 will be moved with the result that the arm 38 is rocked, rocking the arm 34 which in turn gradually rotates the drum over the core 25 to the end that insects which have been attracted to the core are first trapped by the wire mesh material of the drum, and swept from the drum by the apron 24 which carries the insects to a point between the core and wire mesh material, to the end that the insects are crushed.

It follows that upon further rotation of the drum, the insects are brushed from the wire mesh material by the brush 30, where they fall from the trap.

What is claimed as new is:—

1. In a device of the character described, a body portion, shafts supported within the body portion, a core mounted on the shafts and adapted to contain bait, a drum rotatable around the core, means for rotating the drum, and means carried by the drum and adapted to engage the core to crush insects on the core, and means carried by the core for removing the insects from the drum.

2. In a device of the character described, a body portion, a stationary core supported within the body portion and adapted to carry bait, a rotatable drum adapted to house a portion of the core, an apron carried by the drum and adapted to engage the core to crush insects on the core, means for rotating the drum around the core, and a brush carried by the core for removing insects from the drum.

3. In a device of the character described, a body portion, a stationary core supported within the body portion, a rotatable drum adapted to partially house the core, said core having a hinged perforated cover and adapted to contain bait, an apron supported by the drum and adapted to sweep the perforated cover of the core to crush insects thereon, means for operating the drum, and means for sweeping insects from the drum.

4. In a device of the character described, a body portion, adjustable means for supporting the body portion by the hames of a harness, a stationary core supported by the body portion and adapted to contain bait, a rotatable drum adapted to partially house the core, means within the body portion and contacting with the drum for rotating the drum around the core, means carried by the drum and contacting with the core for crushing insects on the core, and means controlled by the movement of the head of the animal supporting the device for actuating the drum operating means.

5. In a device of the character described, a body portion, a core supported within the body portion and adapted to contain bait to attract insects, a rotatable member movable around the core and having means to crush insects on the core, and means for rotating the rotatable member.

6. In a device of the character described, a body portion, a core adapted to contain bait to attract insects, a drum operating around the core, an apron carried by the drum and adapted to fall onto the core, as the drum is being rotated, said apron adapted to crush insects on the core, means for removing the insects from the drum, and means for operating the drum.

7. In a device of the character described, a body portion, a stationary core supported within the body, a rotatable drum movable around the core, means carried by the drum and adapted to fall onto the core to crush insects on the core, a pivoted arm supported within the body portion and having frictional engagement with the drum for rotating the drum, and means controlled by the movement of an animal's head supporting the device for rotating the drum.

8. In a device of the character described, a body, a stationary core supported within the body, said core adapted to contain bait to attract insects, and means rotatable around the core for crushing insects on the core.

9. In a device of the character described, a body portion, a stationary bait containing core supported within the body portion, a drum movable around the core and carrying means adapted to sweep the core to crush insects thereon, a brush member supported by the core and adapted to contact with the drum to brush insects from the drum, and means controlled by the movement of the animal supporting the device for operating the drum.

10. In a device of the character described, a body portion, a stationary core supported by the body portion, said core adapted to contain bait to attract insects thereto, said core having a cavity and having elongated bearings positioned within the cavity, a brush including a shaft, said shaft having its ends positioned within the bearings, said brush adapted to automatically adjust itself within the bearings, a drum adapted to rotate around the core, means carried by the drum for crushing insects on the core, and means for rotating the drum.

In testimony that I claim the foregoing as my own I have hereto affixed my signature in the presence of a witness.

BENJAMIN F. ALINK.

Witness:
 I. E. SIMPSON.